United States Patent Office 3,011,940
Patented Dec. 5, 1961

3,011,940
METHOD OF PRODUCING BIOLOGICALLY ACTIVE SOLUTIONS
Carol H. Bollenback, Palos Park, Ill., assignor to Nalco Chemical Company, a corporation of Delaware
No Drawing. Filed Sept. 2, 1958, Ser. No. 758,606
4 Claims. (Cl. 167—31)

This invention relates to a liquid extraction process for the removal of insoluble impurities contained in commercial grades of halogen substituted phenols.

Halogen substituted phenols comprise a group of compounds having a wide variety of useful properties. These chemicals are well known for their ability to control and inhibit the growth of numerous species of microorganisms. They are used as biologically active agents in such industries as the paper, lumber, textile and agricultural industries and have been accepted as valuable aids in preventing waste and decay caused by the uncontrolled growth of microorganisms. These compounds are particularly effective in controlling microorganisms found in cooling towers and in water used to recover petroleum by secondary water-flood operations.

One of the most useful applications for these chemicals is the treatment of industrial process waters to mitigate and protect against molds, slimes and fungi of all types.

When halogen substituted phenols are employed in industrial processes it is usually the practice to use technical or commercial grades. Chemical refining or purification of halogen substituted phenols in the manufacturing process would place an increased cost on the product. Commercial grades are satisfactory in most cases since the products may be used as supplied, usually in the form of crystalline solids.

In some cases, however, it is beneficial to have the various halogen substituted phenols in the form of stable concentrated solutions. When commercial grades of halogen substituted phenols are dissolved in alkaline polar liquids such as water and/or alcohols the solutions will tend to throw out impurities in the form of crystals or fine particles which often act to precipitate active halogen substituted phenols. These impurities tend not only to make the solution unattractive but are not acceptable to most industrial users.

The impurities contained in halogen substituted phenols and their alkali metal salts are, for the most part, inorganic salts such as sodium sulfate and the salts of such metals as copper and aluminum. Depending upon the particular manufacturing process employed, the impurities may not only be inorganic salts but may be metal complexes of organic materials. For a complete discussion of the various manufacturing processes for the several halogen substituted phenols, see "Encyclopedia of Chemical Technology," vol. 10, p. 317 et subs., Interscience Publishers, 1953.

By analysis, commercial grades of halogen substituted phenols have impurities present as biologically inert components ranging from about 1% by weight to as much as 15% by weight. Thus, a typical technical grade of pentachlorophenol contains 83% by weight of pure pentachlorophenol, 12% of other mixed chlorinated phenols and 5% of inert ingredients. The dry sodium salt of a commercially available pentachlorophenol was found to contain 75% by weight of sodium pentachlorophenate, 13% of other sodium chlorophenates and 12% of inert ingredients. Similarly, other halogen substituted phenols contain inert, impure ingredients which tend to precipitate from solutions prepared therefrom. A certain percentage of these inert ingredients is usually insoluble in most polar solvents.

In using halogen substituted phenols as biologically active chemicals it is advantageous if they are combined with certain other materials to render more effective their microbiological activity. In some cases mixtures of specific halogen substituted phenols give unexpected results when blended into liquid formulations.

It is therefore an object of the invention to provide a method of removing polar liquid insoluble impurities from commercial grades of chlorinated phenols.

Another object is to furnish chemically stable, concentrated solutions of alkali metal halogen substituted phenols. Other objects will appear hereinafter.

In accordance with the invention, it has been found that insoluble impurities contained in commercial grades of halogen substituted phenols may be removed from polar solvent solutions of their alkali metal salts by treating such solutions with a minor, yet effective, amount of aliphatic petroleum naphtha. By using such a solvent extraction technique, concentrated, chemically stable solutions can be easily and conveniently produced.

The various halogen substituted phenols, containing insoluble manufacturing impurities include such substituted phenols as orthochlorophenol, para-chlorophenol, 2,4-dichlorophenol, 2,4,5-trichlorophenol, 2,4,6-trichlorophenol, 2,3,4,6-tetrachlorophenol, pentachlorophenol, 4-chloro-meta-cresol, 4-chloro-3,5-xylenol and para-chloro-ortho-benzylphenol. The other well known substituted phenols as well as the corresponding bromo-, iodo- and fluoro-substituted phenols may also contain impurities.

To solubilize the halogen substituted phenols in polar solvents such as water or alcohol it is necessary to prepare the alkali metal phenates. This is most conveniently accomplished by adding with the halogen substituted phenol alkali such as an alkali metal hydroxide to the solvent in a stoichiometric amount. The pH of the resulting solution should then be adjusted to give a pH of at least 8. The solutions produced by the practices of the present invention have a pH of at least 8 and preferably a pH of from 11.5 to 13.5.

The polar solvents found most useful in preparing the stable concentrated solutions of the invention comprise a mixture of a water soluble alcohol and soft water. These solvents may be combined in a weight ratio of alcohol to water of from 4:5 to 4:15 and preferably 2:3.

While any water soluble alcohol may be used in preparing the solvent combination, good results are obtained by using either diacetone alcohol or an alcohol of the formula

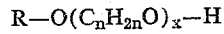

$$R-O(C_nH_{2n}O)_x-H$$

where R is from the group consisting of hydrogen and lower alkyl groups of from 1 to 6 carbon atoms in chain length, $n$ is an integer of from 2 to 4 and $x$ is an integer of from 1 to 4.

Examples of such alcohols are ethylene glycol, 1,2-propylene glycol, butylene glycol, diethylene glycol, triethylene glycol and the higher water soluble polyoxyalkylene glycols such as the several polyoxyethylene, polyoxypropylene and polyoxybutylene glycols as well as heteric mixtures thereof.

Especially good co-solvent alcohols are the lower alkyl ethers of glycols and polyoxyalkylene glycols. Several illustrative compounds are diethylene glycol monobutyl ether, ethylene glycol monobutyl ether, 1-methoxy-2-propanol, dipropylene glycol monomethyl ether and tripropylene glycol monoethyl ether. A particularly outstanding co-solvent is "Dowanol 93B2" manufactured by the Dow Chemical Company. This material is a mixture of mono-, di-, and tripropylene glycol methyl ethers and has the following properties.

Pounds per gallon at 25° C _____ 7.87
Refractive index at 25° C _____ 1.416
Flash point _____ °F__ 134
Viscosity at 25° C. (centipoises) _____ 1.05
Pour point _____ °F__ 121
Specific gravity at 25/25° C _____ 0.943-0.945

The soft water may be prepared by either distillation or by ion exchange techniques and should not have a total hardness (as $CaCO_3$) exceeding ½ grain per gallon (8.5 parts per million) and preferably not more than 1 part per million. It was found that when water, such as Chicago tap water, was used to prepare compositions of the invention, minor amounts of cloudiness occurred.

When commercial grades of alkali metal halogen substituted phenates are added to solvent mixtures of the types described and the pH adjusted to between 8 and 11.5 the impurities from the phenates begin to separate in periods of time, ranging from a few minutes to as much as a few days, depending upon the ingredients used, temperature and the particular solvent chosen.

It was found that these impurities could be rapidly removed by adding to the solutions from 2% to 5% and preferably 3% to 4% by weight of an immiscible aliphatic petroleum naphtha. After a slight mixing period the treating solution is allowed to stand for a period of time sufficient to permit the naphtha to rise to the top of the solution. Contained in the naphtha layer are the impurities which may be separated from the mix by decantation, withdrawal of the finished solution from the top naphtha layer by appropriate drainage techniques, centrifugal separation or filtration.

When large scale operations are used, the petroleum naphthas may be recovered by suitable distillation methods. The amounts used are so small, however, the economics of the process permit solvent loss without a substantial increase in the cost of the finished solutions.

The solvent immiscible, aliphatic naphthas include petroleum distillate solvents having boiling ranges from about 110° to 400° F. and an aromatic content not exceeding 20%. They include such products as Stoddard solvent, varnish makers naphtha and rubber solvent naphtha which is distilled from a paraffin base crude. Of these solvents the best results have been obtained using Stoddard solvent.

As will be shown later, in some instances, it is desirable to incorporate into the finished liquid solutions a minor amount of non-ionic, water-soluble wetting agent.

Typical compositions which may be prepared are listed below in the General Formula.

GENERAL FORMULA

| Ingredients | Percent by Weight |
| --- | --- |
| A. Halogen substituted alkali metal phenate: | |
| (1) General Range | 15-35 |
| (2) Preferred Range | 24-35 |
| B. Water Soluble Alcohol: | |
| (1) General Range | 20-60 |
| (2) Preferred Range | 25-45 |
| C. Soft Water: | |
| (1) General Range | 25-75 |
| (2) Preferred Range | 25-35 |
| D. Non-ionic wetting agent: | |
| (1) General Range | 2-10 |
| (2) Preferred Range | 2-5 |
| E. Aliphatic petroleum Naphtha: | |
| (1) General Range | 2-5 |
| (2) Preferred Range | 3-4 |
| F. Alkali metal hydroxide sufficient to adjust the pH to at least 8. | |

In the above formula the non-ionic wetting agent is an optional, yet desirable, ingredient from the standpoint of biological activity. When it is not included in the composition, a compensating amount of water soluble alcohol or soft water may be used.

In order to further illustrate the techniques that may be employed, the following is given by way of example.

*Example I*

The chemicals listed below constituted a charge to a reaction vessel fitted with an outlet at the bottom and a mechanical stirrer.

| Chemical | Percent by Weight |
| --- | --- |
| Pentachlorophenol | 16 |
| 2,4,5-trichlorophenol | 8 |
| Dowanol 93-B2 | 25 |
| Stoddard Solvent | 3 |
| Dodecyl alcohol reacted with 9 mols of ethylene oxide | 3 |
| Soft water | 32 |
| Potassium hydroxide (45% solution) | 13 |

The chemicals were added and mixed in the order given. The chlorinated phenols were not solubilized until the potassium hydroxide was added. After all the ingredients were mixed, the product was allowed to stand for 4 hours. During this time fine dust size particles floated to the top of the mixture, with, and were entrained in, the Stoddard solvent. The remaining clear brown liquid product was withdrawn from the bottom of the vat. The product was stable and microbiologically active after 9 months of storage at room temperature.

The physical characteristics of the finished product were as follows:

Color _____ Amber
Specific gravity at 60° F _____ 1.164
Flash point (Cleveland Open Cup) __ Boiled at 205° F.
Fire point _____ 212° F.
Cloud point (ASTM) _____ −110° F.
pH _____ 13.1

A sample of this batch was stored at 80° F. for 12 hours, then allowed to warm to room temperature, cooled again, etc. After 10 changes in temperature and 4 weeks of storage, the formula showed no evidence of clouding or precipitation.

Another example of the above product was used to test the corrosiveness of the formula. Small steel and brass and brass coupons of the grades used in shipping containers and fittings were submerged and partially submerged in the test solution under conditions simulating actual drum storage and use patterns. The corrosion rate on the partially submerged steel coupon was 2.4 mils per year. For the fully submerged steel and brass coupons it was 1.1 and 1.6 mils per year, respectively. No gas formation was evident.

For purposes of comparison the same formula was prepared without using Stoddard solvent. Precipitation was evident within 3 to 7 days and the product was not deemed suitable for commercial usage.

In the specification and claims the expression "alkali metal halogen substituted phenates" or its equivalent has been used with reference to weight percents in conjunction with formulae and the preparation of formulae. It is to be understood that these weights were based on the weight of the potassium salts and where other alkali metal salts were employed, equivalent weights should be used.

The term "biologically active agent" as used herein is meant to define a substance or material which will act to the detriment of microorganisms and/or biological growth.

The usefulness of the products produced by this invention as microbiological agents are described in my copending application, for Biologically Active Agents, filed December 10, 1956, Serial No. 627,126, now U.S. Patent No. 2,925,361, of which this application is a continuation-in-part, and fully incorporates said co-pending application herein by reference.

The invention is hereby claimed as follows:

1. The method of removing insoluble impurities from alkaline water-alcohol polar solvent solutions of commercial grades of halogen substituted phenols which consists of extracting the impurities by contacting the solutions with from 2% to 5% by weight of water immiscible, aliphatic petroleum naphtha having a boiling range from about 110° F. to about 400° F. and an aromatic content not exceeding 20%, allowing the aliphatic petroleum naphtha to separate from the polar solvent solutions and then removing the aliphatic petroleum naphtha from the so-treated polar solvent solutions.

2. The method of claim 1 wherein the aliphatic petroleum naphtha is Stoddard solvent.

3. The method of claim 1 wherein the polar solvent constituent of said polar solvent solution is a mixture of soft water and a water soluble alcohol from the group consisting of diacetone alcohol and an alcohol of the formula $$R-O(-C_nH_{2n}O)_x-H$$

where R is from the group consisting of hydrogen and lower alkyl groups of from 1 to 6 carbon atoms in chain length, $n$ is an integer of from 2 to 4 and $x$ is an integer of from 1 to 4, the weight ratio of water soluble alcohol to soft water being within the range of 4:5 to 4:15.

4. The method of claim 1 wherein the alcohol constituent of said polar solvent solution is a water soluble alcohol which is a lower aliphatic monoether of an aliphatic diol from the group consisting of propylene glycol and lower polypropylene glycols.

References Cited in the file of this patent

UNITED STATES PATENTS

| | | |
|---|---|---|
| 2,382,944 | Porter | Aug. 14, 1945 |
| 2,727,927 | Vriens et al. | Dec. 20, 1955 |
| 2,744,144 | Sheffield | May 1, 1956 |
| 2,782,242 | Clark | Feb. 19, 1957 |
| 2,790,834 | Morton et al. | Apr. 30, 1957 |